United States Patent [19]

Musgrove

[11] 3,872,002

[45] Mar. 18, 1975

[54] PROCESS FOR EXTRACTING PHOSPHATE FROM SOLUTIONS

[75] Inventor: Ralph E. Musgrove, Midland, Tex.

[73] Assignee: GeoResources, Inc., Williston, N. Dak.

[22] Filed: Mar. 29, 1973

[21] Appl. No.: 346,090

[52] U.S. Cl. ............................ 210/59, 71/13, 71/24
[51] Int. Cl. .............................................. C02c 5/02
[58] Field of Search ............ 210/39, 40, 36, 37, 43, 210/45, 47, 49, 51, 52, 53, 59, 60, 42; 260/515 H; 71/24, 12, 13

[56] References Cited

UNITED STATES PATENTS

| | | | |
|---|---|---|---|
| 3,114,625 | 12/1963 | Higuchi et al. | 71/24 |
| 3,398,186 | 8/1968 | Schwartz | 260/515 H |
| 3,401,114 | 9/1968 | Carlton et al. | 210/40 |
| 3,424,676 | 1/1969 | Johnson et al. | 210/40 |
| 3,767,570 | 10/1973 | Clapp | 210/40 |

FOREIGN PATENTS OR APPLICATIONS 15,079  6/1909  Great Britain ...................... 210/59

OTHER PUBLICATIONS

Sinha, Mohan K.; Chem. Abstract, Vol. 73 (1970): 97902p.

*Primary Examiner*—Samih N. Zaharna
*Assistant Examiner*—Benoit Castel

[57] ABSTRACT

Preparation of insoluble salts of humic acid under controlled conditions; use of humates to extract phosphate contaminants from solutions, such as wastewaters, generally in the naturally-occurring pH range, and removal of the resulting humate/phosphate component from the solution; and regenerating the humate in said humate/phosphate component under aqueous alkaline conditions.

12 Claims, No Drawings

PROCESS FOR EXTRACTING PHOSPHATE FROM SOLUTIONS

BACKGROUND OF THE INVENTION

In recent years, governmental agencies and industries have become concerned by the fertilization, and resultant stimulated growth rates, of aquatic plants caused by plant nutrients in wastes entering lakes and streams. These plant nutrients when coupled with favorable environmental conditions can result in sustained geometric rates of growth of algae or other plant forms.

The result of artificially accelerated plant growth is rapid deterioration of the quality and utility of the surface waters afflicted by such growths. In lakes algae blooms, as such high growth rate periods are called, can create conditions inimical to aquatic animals either by the creation of toxins or by consuming the available oxygen. Decomposition of large masses of algae also causes unpleasant tastes and odors which are expensive to control.

In streams stimulated plant growth also has the effect of reducing stream velocity which can result in undesired siltation and thereby reduces the capacity of the stream to accommodate increased water flow.

In addition to the ecological deterioration described above, excessive plant growth, during the decay cycle, reduces the capacity of afflicted waters to oxidize organic contaminants. This lessened detoxifying capacity renders the waters less suitable to receive waste discharges.

Of the several nutrients required for plant growth, phosphorus is considered to be most amenable for control. Potassium, magnesium, calcium, sulfate and carbon dioxide are so ubiquitous that an excess of plant nutritional needs is usually present in all waters. Since some algae can fix atmospheric nitrogen, growth control by limiting nitrogen inputs to lakes and streams is difficult. Phosphorus, the remaining common nutritional element, is not normally as available as the others from the environment and, therefore, restriction or elimination of phosphorus sources can control undesired aquatic growth.

Phosphorus entering a lake or stream originates from numerous sources and the relative contribution of these sources is very dependent on the utilization of the lands adjacent to the water. It is estimated that municipal and industrial wastes contribute 70% of the phosphorus entering Lake Erie, 57% of the phosphorus entering Lake Ontario and from 90% to 99% of the phosphorus discharged from the Potomac River.

The sources of phosphorus in municipal sanitary sewage are both domestic and industrial. Domestic sewage contribution of phosphorus stems from (a) human excretions which range from 0.5 to 2.3 pounds per capita per year with a mean annual excretion of about 1.2 pounds per individual and accounts for from 30 to 50% of the phosphorus; (b) detergents used primarily for home laundry often contain phosphorus and are estimated to contribute a mean of 2.3 pounds per capita per year, which represents from 50 to 70% of the phosphorus, and (c) a third significant source occurs when phosphate salts are added to domestic water supplies to prevent corrosion and scale formation in the water distribution system. This source when present can contribute from 2 to 20% of the phosphorus.

Phosphorus content in domestic sewage is highly variable, ranging from about 4 to 20 milligrams per liter (as P). The average total phosphorus in domestic sewage is estimated at about 10 milligrams per liter (as P).

Among the industrial sources of phosphorus are potato processing, fertilizer manufacturing, animal feedlots, metal finishing, flour processing, dairies, commercial laundries and slaughterhouses. The contribution of phosphorus to a specific municipal sanitary sewage system by these potential sources is highly variable.

A large and rapidly increasing number of communities have facilities for treating municipal sewage. The primary goal of the treatment systems used in these facilities is to reduce the content of organic matter and pathogenic bacteria in the water with only an incidental reduction of the phosphorus content. The treatment systems which employ the activated sludge process as a secondary treatment step remove over 90% of the biologically oxidizable organic matter while simultaneously reducing the phosphorus content by 20 to 30%.

A number of studies have demonstrated specific phosphate removal systems. The most frequently examined approach has been the precipitation of phosphates as insoluble salts followed by separation of the precipitates from the liquid by filtration, sedimentation, or other liquid solid separation methods.

In the several precipitation methods which have been investigated the solution pH has been found to be an important determinant of the completeness of phosphate precipitation. Optimum pH for lanthanum precipitation is in the range 4.5 to 8.5; optimum pH for calcium is about pH 10. It is therefore necessary to adjust solution pH, to achieve optimum phosphate precipitation, from the normal range of pH 7 – 8 when utilizing metallic salts as phosphate precipitants.

Phosphate removal by reverse osmosis and by anion iron exchange resins has also been investigated and demonstrated to be effective in removing phosphate from wastewaters. Both of these methods, however, are subject to decreasing efficiency during use caused by fouling from the organic compounds usually present in the wastewater.

It would therefore be an advantage to the art if a phosphate extractant would require no pH adjustment from the normal range of pH 7 – 8. Another advantage would be realized if this adsorbent would be immune to organic fouling and of such a particle size as to be readily separated from the wastewater. A further advantage would be realized if the adsorbent were relatively inexpensive and would also impart no deleterious qualities to the treated wastewater.

SUMMARY OF THE INVENTION

The present invention has for one of its primary objects provision of an economical extracting agent capable of removing phosphate contaminants from solutions, such as wastewaters, preferably in the naturally-occurring pH range of the solutions.

Another object is to provide an extracting agent for phosphate contaminants, i.e., phosphate ions or phosphorus anions, which is not subject to organic fouling with a resultant decrease in phosphate extraction.

Another object of the invention is to provide a phosphate extracting agent of a relatively inexpensive nature which can be either utilized for another purpose after phosphate extraction or can be regenerated relatively inexpensively for reuse as a phosphate extracting agent.

Another object of the invention is to provide a phosphate extracting agent which will not contribute undesirable chemical constituents which would decrease the quality of the effluent wastewater.

Another object of the invention is to provide a phosphate extracting agent which may be readily removed from the wastewater.

DESCRIPTION OF THE PREFERRED EMBODIMENTS

The present invention relates to the removal or extraction of phosphate contaminants, such as phosphate ions or phosphorus anions, from solutions, including wastewaters in the form of sewage, waste streams, and the like, by treating these wastewaters, usually at their naturally-occurring pH, with a water-insoluble humic acid salt, such as an iron or aluminum salt, and separating the resulting humate/phosphate component from the solution.

Another embodiment of the instant discovery involves the preparation of a water-insoluble humate by the reaction of humic acid or a humic acid-rich source, such as leonardite, with a metal salt capable of reacting therewith and forming a water-insoluble salt of humic acid, which humate is precipitated out of solution and used to treat, say, wastewaters, as hereinbefore just described. Typical metal salts are the iron and aluminum salts of a mineral acid, such as ferric chloride, ferric sulfate, ferrous sulfate, aluminum chloride, aluminum sulfate, and the like. Waste solutions from metal cleaning or pickling operations which contain iron or aluminum can be utilized in the preparation of the humic acid salts herein contemplated.

Still another embodiment within the purview of present discovery comprises regenerating the humate extracting agent by contacting the humate/phosphate component with an aqueous alkaline solution, such as an ammoniacal solution, separating the humate from the solution and recovering thus-regenerated humate; preferably, the regenerated humate is water washed to further enhance removal of the phosphate ions.

Other humic acid-rich sources, besides leonardite, suitable for the present invention are peat, oxidized low rank coal, and the like.

According to a preferred embodiment, the humates herein contemplated are the reaction products of a source of humic acid which is first treated with an alkali solution, such as ammonium hydroxide, and then precipitated by the addition of a metal salt, preferably an iron or aluminum salt.

The many humic acid sources contemplated herein and the properties of this acid are well known. Typical sources are the aforementioned leonardite, peat, brown coal, lignite, articicially oxidized coals, and, of course, humus, which is generally found in the top layer of soils containing organic decomposition products of vegetation. The invention contemplates use of these raw materials or others containing various amounts of humic acid. It is preferred that the impure material, as mined, be used as the source of humic acid due to the low cost inherent in an unprocessed raw material. For this reason it is desired to utilize a raw material with a high content of humic acid.

One preferred source of humic acid is leonardite which typically contains 28 to 42 per cent humic acid as mined. Leonardite is a specific organic substance named for A. G. Leonard who was among the first to study this naturally occurring material. Leonardite is a coal-like substance which has a higher oxygen content, a less compact structure, a lower Btu content and poorer combustibility than lignite, with which it is often found associated. The oxygen content of leonardite ranges from 27 – 33% as compared to lignite which has an oxygen content ranging from 19 – 20% by weight. Leonardites are humic acid salts of sodium, aluminum, iron, magnesium, calcium and other cations mixed with mineral matter, such as gypsum, silica and clay, and various amounts of adsorbed water.

In order to synthesize the iron or aluminum humate of the invention, the humic acid source is contacted with iron or aluminum salts in solution, preferably water. Also, preferably, the pH of the humic acid water slurry is adjusted to a pH above 7 with an alkali. It is preferred to adjust the pH to a value of 9.0 – 9.5 using anhydrous ammonia as the alkali. When the slurry pH is adjusted to the preferred range the reaction rate is greatly enhanced, since at the preferred pH range solubilization of humic acid occurs and the subsequent addition of iron or aluminum ions causes a rapid and complete reaction to occur forming as the product an iron or aluminum humate precipitate. The humic acid salt formed is dewatered, washed to remove soluble salts and dried.

EXAMPLES

The following examples illustrate typical methods of preparing the humate salts contemplated herein:

EXAMPLE I

One hundred grams of leonardite (16.4% water, 3.7% iron on wet basis) was slurried in 1,400 ml. of water. The pH was raised to 9.5 by adding ammonium hydroxide and a ferric chloride solution was added until pH reached 4.5 and precipitation of the organic acid was complete. The precipitate was filtered and washed until the filtrate contained only a trace of iron. The precipitate was then dried and ground to pass a 270 mesh screen. This iron leonardite was designed as Composition A.

EXAMPLE II

This preparation followed the procedure outlined generally in Example I, with the exception that aluminum nitrate was used to precipitate the organic acid and the final pH was 6.5. This product was designated as Composition B.

EXAMPLE III

This preparation followed the procedure outlined generally in Example I, with the exception that ferrous sulfate was used as the iron source and the ammoniated leonardite solution was added to the iron solution. The concentration of the iron solution ranged from 10 grams of iron per liter to 10 milligrams of iron per liter at initial pH values ranging from 2.0 – 3.5. The precipitates from several preparations were composited and this product was designated as Composition C.

EXAMPLE IV

Two hundred grams of leonardite (at 16.4% moisture) was added to 2.8 liters of water and agitated for five minutes. The pH of this slurry was 4.0. Ammonium hydroxide was added to raise the slurry pH to 9.6. This pH adjustment required 66 milliliters of reagent grade ammonium hydroxide. To the pH adjusted mixture 550 milliliters of ferric chloride solution, containing 450 grams of $FeCl_3·6H_2O$ in 1,500 milliliters of water, was added. The slurry was agitated for 60 minutes at which time the pH was 2.8. The slurry was filtered and washed repeatedly with water until the wash was essentially iron free. The precipitate was dried sufficiently to permit grinding to pass a 270 mesh screen. The yield of iron humate was 200.5 grams with a moisture content of 8.3% and the iron content was 12.05%. This product was designated as Composition D.

The moisture and iron content of the leonardite raw material and the iron or aluminum humate precipitates are shown in Table I.

TABLE I

| Material | Iron % | Aluminum % | Moisture % |
|---|---|---|---|
| Leonardite | 3.69 | | 16.4 |
| Composition A | 46.00 | | 9.5 |
| Composition B | — | 15.00 | 8.7 |
| Composition C | 22.47 | | 10.2 |
| Composition D | 12.05 | | 8.3 |

In order to determine the efficacy of the invention the iron or aluminum humates were tested for their utility in extracting phosphate from municipal sewage and from phosphate solutions. In these tests the general procedure was to first filter primary sewage influent through a retentive filter paper so as to remove all solid material. This step was only necessary in these tests to demonstrate the phosphate extraction by the humates which were separated from the solution by filtration with similar filter paper. Subsequent to filtration the pH of the phosphate containing solutions was determined and a sample was analyzed for total phosphate content. Varying amounts of Compositions A, B, C and D were added to the phosphate containing solutions, mixed for various times, usually 5 to 20 minutes, filtered and the phosphate content and pH of the filtrate was determined. In Table II are listed the results of these determinations.

TABLE II

| Composition | Treatment Rate grams/liter | Initial pH | Initial P mg/liter | % Extraction |
|---|---|---|---|---|
| Leonardite | 1.0 | 7.8 | 6.78 | 20.8 |
| Leonardite | 1.0 | 7.7 | 6.78 | 15.9 |
| Leonardite | 2.4 | 8.5 | 7.9 | 22.6 |
| Leonardite | 2.4 | 8.5 | 6.1 | 31.4 |
| Leonardite | 1.0 | 9.5 | 5.7 | 85.0 |
| A | 1.0 | 7.6 | 4.79 | 48.0 |
| A | 1.0 | 7.4 | 2.50 | 93.5 |
| A | 4.0 | 6.9 | .85 | 97.7 |
| A | 4.0 | 7.5 | 4.8 | 82.3 |
| B | 4.0 | 8.5 | 6.8 | 78.1 |
| B | 4.0 | 8.5 | 1.5 | 73.0 |
| C | 6.0 | 8.3 | 5.6 | 34.27 |
| D | 2.0 | 7.5 | 5.7 | 60.0 |
| D | 2.0 | 7.7 | 2.3 | 72.0 |
| D | 4.0 | 7.5 | 5.7 | 79.2 |
| D | 4.0 | 7.6 | 1.2 | 81.8 |
| D | 40.0 | 9.0 | 1500.0 | 99.1 |

Iron humate which had been used for phosphate extraction from sewage was regenerated by slurrying 20 grams of iron humate in 100 milliliters of water which has been adjusted to pH 9 with ammonium hydroxide. The slurry was filtered, washed repeatedly with water, dried and ground to pass a 270 mesh screen. Under identical extraction conditions this regenerated iron humate showed an extraction efficiency which was 95.1% as compared to freshly prepared iron humate Composition D.

Although the present invention has been described with reference to the specific details of certain embodiments thereof, it is not intended that such details shall be regarded as limitations upon the scope of the invention except insofar as included in the accompanying claims.

What is claimed is:

1. A method of extracting water-soluble phosphate contaminants from a solution which comprises intimately blending a water-insoluble humic acid salt selected from the group consisting of iron humate, aluminum humate and mixtures thereof with the solution containing said water-soluble phosphate contaminants, subsequently removing the resulting water-insoluble humate/phosphate solids component from the solution, leaching said humate/phosphate solids component with an alkali solution and separating the resulting regenerated humate separated as solids from the leach solution.

2. The method of claim 1 wherein the water-insoluble humic acid salt is iron humate.

3. The method of claim 1 wherein the water insoluble humic acid salt is aluminum humate.

4. The method of claim 1 wherein the humic acid salt is prepared by admixing a source of humic acid with water, adjusting the pH to a value greater than 7, adding to the humic acid mixture a soluble mineral acid salt of a metal selected from the group consisting of iron and aluminum, and separating the resultant humate precipitate from the liquid.

5. The method of claim 1 wherein the source of humic acid is leonardite.

6. The method of claim 1 wherein the source of humic acid is low rank coal.

7. The method of claim 1 wherein the source of humic acid is peat.

8. The method of claim 1 wherein the mineral acid salt is ferric or ferrous chloride.

9. The method of claim 1 wherein the mineral acid salt is an aluminum salt.

10. The method of claim 1 wherein the regenerated humate solids are washed and dried.

11. The method of claim 10 wherein the alkali solution is an ammonium hydroxide solution.

12. The method of claim 11 wherein the regenerated humate solids are blended with a solution containing phosphate contaminants, humate/phosphate solids are formed and removed, and the latter are again leached and regenerated prior to their further use in extracting phosphate contaminants from a solution containing the same.

* * * * *